United States Patent [19]

Ishikawa

[11] Patent Number: 4,563,394
[45] Date of Patent: Jan. 7, 1986

[54] SHAPED ARTICLE OF SYNTHETIC RESIN HAVING IMPROVED SURFACE

[75] Inventor: Nobuo Ishikawa, Yokohama, Japan

[73] Assignees: Kuraray Co., Ltd., Okayama; Daikin Industries Ltd., Osaka, both of Japan

[21] Appl. No.: 635,071

[22] Filed: Jul. 27, 1984

[30] Foreign Application Priority Data

Jul. 29, 1983 [JP] Japan ................ 58-139940

[51] Int. Cl.⁴ ............................ B32B 27/00
[52] U.S. Cl. .................... 428/422; 428/36; 428/260; 428/288; 428/290; 427/389.9; 427/391; 427/393.4; 525/60; 525/61; 525/330.3; 525/330.6; 525/359.3; 525/437
[58] Field of Search ........... 525/60, 61, 330.3, 359.3, 525/437, 330.6; 428/36, 260, 290, 288, 422

[56] References Cited

U.S. PATENT DOCUMENTS 2,983,626 5/1961 Schneider et al. .............. 525/61
3,784,355 1/1974 Fielding ...................... 427/335
4,004,048 1/1977 Jackson ....................... 427/160

FOREIGN PATENT DOCUMENTS 904877 9/1962 United Kingdom .
1000802 8/1965 United Kingdom .

Primary Examiner—Joseph L. Schofer
Assistant Examiner—J. M. Reddick

[57] ABSTRACT

A shaped article of a synthetic resin having an improved surface such as a surface showing excellent water repellency and oil repellency which comprises a synthetic resin having hydroxy groups at least one surface of which being treated with an oligomer of a fluoroalkylene oxide represented by the formula:

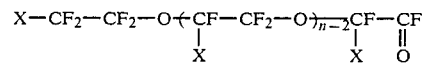

wherein X is F or $CF_3$ and n is an integer of 2 to 12.

11 Claims, No Drawings

SHAPED ARTICLE OF SYNTHETIC RESIN HAVING IMPROVED SURFACE

The present invention relates to a shaped article of a synthetic resin having an improved surface treated with an oligomer of a fluoroalkylene oxide.

Among various known materials, that having a fluorocarbon surface is characterized by extremely low surface energy. Remarkable non-adhesiveness of a fluorocarbon surface, i.e., such surface properties as "hard to wet", "hard to dirty", "easy to slide" and the like as well as its heat resistance and chemical resistance are resulted from distinctive properties of fluorocarbon group which can hardly be attained by other elements. Owing to such distinctive properties, the use of fluorocarbon for particular purposes has been gradually developing in spite that it is expensive. Representative examples of such purposes include surface finish of a steam iron, an electronic vacuum bottle and a rice paste making machine, fluorine stainproof treatment of fabrics which provides water and oil repellency, and the like.

Although a silicone compound or the like has been used as a water repellent for fabrics for a long time, an oil repellent which can also repel a material having low surface tension such as fats and oils or oily dirt has been firstly realized by a fluorinated compound. In general, a fluorine-containing repellent can exert its desired effect in an amount of about one tenth of that required for a silicone repellent and it has such advantages that hand-touch feeling as well as fast dyeing properties of fiber are hardly deteriorated.

At present, a commercially available fluorine-containing water and oil repellent for fabrics is a polymer having a chemical structure composed of a hydrocarbon backbone with one or more fluorocarbon pendant groups bonded thereto. This repellent is intended for obtaining such an effect as if a monomolecular layer of fluorocarbon is formed on the surface of each fiber treated therewith.

However, since such a fluorine-containing repellent merely physically adheres to the surface of a shaped article such as fiber, it is very difficult to firmly fix it to the surface of the shaped article.

The main object of the present invention is to improve such a drawback in a conventional fluorine-containing repellent and is to provide a shaped article of a synthetic resin having an improved surface.

This object as well as other objects and advantages of the present invention will become apparent to those skilled in the art from the following description.

According to the present invention, there is provided a shaped article of a synthetic resin having an improved surface which is prepared by treating the shaped article of the synthetic resin having one or more hydroxy groups with an oligomer of a fluoroalkylene oxide.

In the present invention, the terminal carboxylic acid fluoride of the oligomer can be esterified with the hydroxy group of a synthetic resin to firmly fix the oligomer to the surface of the synthetic resin and, therefore, water repellency and oil repellency of the resulting surface of the synthetic resin are hardly deteriorated even with the elapse of time. Further, the treatment of a shaped article of a synthetic resin with the oligomer hardly causes deterioration of other superior properties thereof such as flexibility of a synthetic resin film and there is no substantial deterioration of its physical properties such as tensile strength. Furthermore, since sufficient water repellency as well as oil repellency can be exerted by applying only a small amount of the oligomer on the surface of a shaped article of a synthetic resin, there is no need to use a large amount of the oligomer which is precious and expensive. Furthermore, as described in the examples hereinafter, excellent water and oil repellency such as critical surface tension ($\gamma_c$) of 20 dyn/cm or less can be obtained.

In addition, although a synthetic resin such as a polyvinyl alcohol resin or a saponified ethylene-vinyl acetate copolymer has excellent properties such as good gas transmrssion resistance, there is a problem to some extent in the use of the resin under high humidity conditions. However, according to the present invention, it is possible to obtain a synthetic resin film of such a resin having no problem in the use thereof even under high humidity conditions.

The oligomer of a fluoroalkylene oxide used in the present invention is represented by the formula [I]:

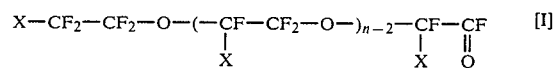

wherein X is F or $CF_3$ and n is an integer of 2 to 12.

Among them, the oligomer of the formula [I]: wherein X is $CF_3$, i.e. the oligomer of hexafluoropropylene oxide (HFPO) represented by the formula [II]:

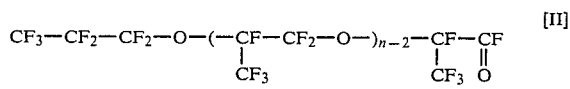

wherein n is an integer of 2 to 12, is particularly preferred. More preferably, n is 3 to 6.

HFPO is a stable perfluoroepoxy compound obtained by oxidation of hexafluoropropylene and is disclosed in British Pat. No. 904,877. Further, it has been known that HFPO is subjected to anionic polymerization in the presence of a base or a fluoride ion to form a polymer composed of from several up to about hundred monomers. Furthermore, U.S. Pat. No. 3,250,808 discloses that the oligomer of HFPO can be used for lubricants, hydraulic fluids, chemical intermediates and the like. British Pat. No. 1,000,802 also discloses that the oligomer of HFPO can be used for lubricants, solvents, dielectric oils and the like. However, it is believed that the oligomer of HFPO have not been used heretofore in the prior art for the treating of the surface of a synthetic resin having hydroxy groups such as a polyvinyl alcohol, a polyester or the like to firmly fix the oligomer to the resin by the direct reaction of esterification.

Since the oligomer of HFPO has the reactive terminal acid fluoride structure and the backbone thereof is a flexible polyether structure which has thermal and chemical stabilities characteristic of a perfluorinated compound, it is free from rigidity as present in a perfluoroalkyl chain and has many $CF_3$ groups which show remarkable water repellency and oil repellency. Therefore, it is most preferable to use this oligomer in the present invention.

By the way, although the oligomer of the formula [I] wherein X is F, i.e., the oligomer of tetrafluoroethylene oxide can be also used in the present invention, in view of the production of the oligomer and water and oil repellency of the surface of a shaped article treated with the oligomer, the one from HFPO is more preferable. The oligomer of tetrafluoroethylene oxide can be produced according to the similar manner to that of HFPO.

As the synthetic resin having hydroxy groups used in the present invention, any synthetic resin having hydroxy groups in the side chain or at the terminal thereof which are capable of esterifying with the above oligomer of the fluoroalkylene oxide such as the oligomer of HFPO can be used. Although the content of hydroxy groups in the resin is not critical, in general, the desired content is 0.01 to 25 meq/g, preferably, 0.05 to 25 meq/g. Examples of the synthetic resin having hydroxy groups include a polyvinyl alcohol resin (hereinafter referred to as PVA), a saponified ethylene-vinyl acetate copolymer (hereinafter referred to as EVOH), a polyvinyl acetal resin (e.g., polyvinyl formal, polyvinyl butyral, etc.), a hydroxyethyl acrylate polymer or copolymer, a polyester resin [e.g. a polyethylene terephthalate having terminal hydroxy groups produced by esterification of a polybasic acid (e.g. terephthalic acid, etc.) and a polyhydric alcohol (e.g. ethylene glycol, etc.)], etc. Among them, a remarkable effect can be obtained by treating PVA resin, EVOH resin or a polyester resin with the oligomer. Examples of PVA resin include that having a degree of saponification of 10 to 100 mole %, preferably, 50 to 100 mole % and a degree of polymerization of 500 to 10,000, preferably, 800 to 5,000. Further, a modified PVA resin produced by saponifying a copolymer of vinyl acetate and another monomer (e.g. an anionic monomer, cationic monomer, etc.) can be also used. As a saponified ethylene-vinyl acetate copolymer, that having an ethylene content of 10 to 90 mole %, preferably, 20 to 80 mole % and a degree of saponification of 10 to 100 mole %, preferably, 50 to 100 mole % is used.

The term "shaped article" used herein includes film, sheet, fiber, non-woven fabric, woven fabric, synthetic paper, various shaped articles (pipe, container, gasket, etc.) and medical shaped articles (catheter, membrane, various artificial internal organs, etc.).

For example, the hydroxy groups on the surface of the shaped article of the synthetic resin, e.g. the shaped article of EVOH is reacted with the terminal fluorinated groups of the oligomer of the fluoroalkylene oxide to form ester bond as shown in the following reaction scheme:

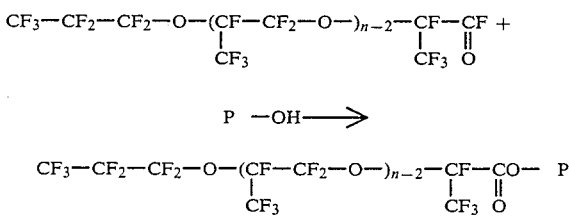

wherein P is the backbone of a synthetic resin having hydroxy groups, for example, EVOH.

Thus, after the treatment according to this invention the shaped article of a synthetic resin having hydroxy groups, for example, the shaped article of EVOH, particularly, EVOH film has excellent gas barrier property, oil resistance, weatherproof property and antistatic properties and, in addition to these excellent properties, excellent water repellency and oil repellency are provided to the surface of the film. For example, EVOH film treated according to the present invention can be suitably used as a material for building a greenhouse since transmission of sunlight is increased owing to water and oil repellency and, at the same time, energy emitted from the ground is shut off owing to the ester bond present in the molecule thereof to increase heat retaining properties.

According to the present invention, the treatment of the shaped article of the synthetic resin with the oligomer of the fluoroalkylene oxide is carried out as follows:

In one method, either or both surfaces of the shaped article are dipped in a solution of the fluoroalkylene oxide oligomer, e.g. the oligomer of HFPO. In this method, it is possible to use a catalyst which accelerates the formation of the ester bond between the hydroxy group on the surface of the shaped article and the oligomer, such as triethylamine or the like and to add ether to prevent evaporation of the oligomer. The shaped article thus treated by dipping is washed with acetone, ether or the like, if necessary, and dried to obtain the desired shaped article of the synthetic resin having the improved surface of the present invention. In general, the treatment is carried out at 0° to 150° C., preferably, 10° to 40° C. for 1 minutes or more, preferably, more than 30 minutes, more preferably 1 hour to 3 days.

In another method, a shaped article is treated with the oligomer in a vapor phase. This vapor phase treatment can be carried out by various ways. For example, the treatment can be carried out by placing the shaped article in a container, evacuating the container and adding the oligomer to the container. Further, the treatment can be carried out by exposing the shaped article to the vapor of the oligomer prepared by heating, or by spraying the vapor of the oligomer to the shaped article. The shaped article thus treated is washed with acetone, ether or the like, if necessary, and dried to obtain the desired shaped article having the improved surface of the present invention. In general, the treatment is carried out at 0° to 150° C., preferably, at 10° to 100° C. for 10 seconds to 3 hours, preferably, 1 minutes to 3 hours, more preferably, 5 minutes to 30 minutes.

In comparison with the above dipping treatment, the latter vapor phase treatment is more advantageous since the amount of the oligomer to be used is smaller and the reaction is more readily proceeded with a shorter reaction time.

The coating weight of the oligomer to the surface of the shaped article of the synthetic resin depends upon a particular oligomer, a particular shaped article and a particular use of the shaped article. However, in general, $10^{-4}$ to $10^{-1}$ g/m² (per one surface), preferably, $10^{-3}$ to $10^{-1}$ g/m² (per one surface) calculated as the weight of fluorine is desirable.

The following examples further illustrate the present invention in detail but are not to be construed to limit the scope thereof.

EXAMPLES 1 TO 3

Dipping Treatment

EVOH film ("Eval E" manufactured by Kuraray Co., Ltd.; ethylene content: 44 mole %; degree of saponification: 99.5 mole %; hydroxy group content: 15 meq/g; thickness: 25μ; size: 1.5 cm×4 cm) was washed according to the following procedures to remove dirt on the surface.

(1) The film was placed in a beaker containing distilled water and washed with a ultrasonic washer for 10 minutes;

(2) The film was taken out and washed with distilled water;
(3) The film was washed with ether;
(4) The film was washed with acetone; and
(5) The film was dried with deaeration by using a vacuum pump.

The film thus washed was dipped in a mixture of the oligomer (2 ml) shown in Table 1 hereinafter, triethylamine (0.1 ml) and ether for preventing evaporation of the oligomer contained in a petri dish. The petri dish was covered and allowed to stand at 25° C. for 2 days. After completion of dipping, the film was taken out, washed with acetone, ether and then acetone and dried with deaeration by using a vacuum pump. The film thus prepared was sticked on the surface of a glass plate (5.0 cm×1.5 cm) with a double-coated adhesive tape and the contact angle was measured by using a contact angle measuring device. When measuring the contact angle, distilled water, glycerin, ethylene glycol and saturated hydrocarbons ($C_{8-17}$) were dropped as the liquid samples on the surface of the film so that the contact diameters of droplets are about 3 mm or less. In order to minimize the errors, the contact angle was measured at 15 points and the average thereof was calculated. The results are shown in Table 1.

EXAMPLES 4 TO 9

Vapor Phase Treatment

EVOH film ("Eval E" manufactured by Kuraray Co., Ltd.; thickness: 25µ; size: 1.5 cm×4 cm) washed according to the same procedure as in Examples 1 to 3 was used in these examples. Three necked round bottom flask (volume: 100 ml) was used. A magnetic stirrer was placed in the flask and a rubber stopper was attached to one side opening. A two-way stopcock was equipped to the other side opening and the film was suspended in the flask through the center opening by a Teflon string. Firstly, the flask was evacuated by vacuum pump through the two-way stopcock for about 10 minutes and the cock was closed. Then, the oligomer (2 ml) shown in Table 2 hereinafter together with a catalytical amount of triethylamine were injected into the flask through the rubber stopper by using a syringe. The treatment was carried out with stirring by using the magnetic stirrer at 25° C. for 20 minutes. After completion of the treatment, the film was taken out, washed with acetone and ether, dipped in acetone and dried with deaeration by using a vacuum pump. According to the same procedure as in Examples 1 to 3, the contact angles were measured by using a contact angle measuring device and similar liquid samples. The results are shown in Table 3.

TABLE 1

| Example Nos. | Oligomers | Critical* surface tension $\gamma_c$ (dyn/cm) |
| --- | --- | --- |
| 1 | $CF_3-CF_2-CF_2-O-CF(CF_3)-CF(=O)$ | 20 |
| 2 | $CF_3-CF_2-CF_2-O-CF(CF_3)-CF_2-O-CF(CF_3)-CF(=O)$ | 19 |
| 3 | $CF_3-CF_2-CF_2-O-(-CF(CF_3)-CF_2-O-)_2-CF(CF_3)-CF(=O)$ | 18 |
| Ref. Ex. 1 | EVOH film without treatment of the oligomer | 35 |

(Note)
*Advancing contact angles of several liquid samples such as above which have known surface tensions are measured on a shaped article to be tested and the surface tensions of the liquid samples $\gamma_L$ (dyn/cm) are plotted against cos θ values of the contact angles θ of the liquid samples, respectively, to prepare a graph (Zisman plot). The critical surface tension is corresponding to the surface tension of a liquid sample to be appeared at the intersection between the graph and cos θ = 1. The value of the critical surface tension is smaller, water repellency as well as oil repellency are higher.

TABLE 2

| Example No. | Oligomers | Coverage of oligomer ($g/m^2$) (as F wt.) | Critical surface tension $\gamma_c$ (dyn/cm) |
| --- | --- | --- | --- |
| 4 | $CF_3-CF_2-CF_2-O-CF(CF_3)-CF(=O)$ | $2.0 \times 10^{-2}$ | 19 |
| 5 | $CF_3-CF_2-CF_2-O-CF(CF_3)-CF_2-O-CF(CF_3)-CF(=O)$ | $4.0 \times 10^{-2}$ | 18 |
| 6 | $CF_3-CF_2-CF_2-O-(-CF(CF_3)-CF_2-O-)_2-CF(CF_3)-CF(=O)$ | $6.0 \times 10^{-2}$ | 17 |

TABLE 2-continued

| Example No. | Oligomers | Coverage of oligomer ($g/m^2$) (as F wt.) | Critical surface tension $\gamma_c$ (dyn/cm) |
|---|---|---|---|
| 7 | $CF_3-CF_2-CF_2-O-(-CF(CF_3)-CF_2-O-)_3-CF(CF_3)-CF=O$ | $3.1 \times 10^{-2}$ | 19 |
| 8 | $CF_3-CF_2-CF_2-O-(-CF(CF_3)-CF_2-O-)_4-CF(CF_3)-CF=O$ | $2.0 \times 10^{-2}$ | 19 |
| 9 | $CF_3-CF_2-CF_2-O-(-CF(CF_3)-CF_2-O-)_5-CF(CF_3)-CF=O$ | $1.7 \times 10^{-2}$ | 20 |

EXAMPLE 10

The surface of EVOH ("Eval E" manufactured by Kuraray Co., Ltd.; thickness: 25μ) film was treated with the oligomer according to the same procedure as in Example 6 except that the treatment was carried out at 30° C. The critical surface tension ($\gamma_c$) of the resulting film was 15.5 dyn/cm.

When flexibility and tensile strength of each film treated in Examples 1 to 10 were evaluated, they were substantially the same as those of the untreated EVOH film of Reference Example 1 in Table 1. Further, when the change in the critical surface tension of each film obtained in Examples 1 to 10 was measured with the elapse of time, little deterioration was observed.

EXAMPLES 11 TO 13

Ethylene terephthalate polyester cloth (hydroxy group content: 0.1 meq/g) was used in these examples. Three necked round bottom flask was used. The first opening was served as an inlet for a reaction mixture and a thermometer was inserted through the second opening. The third opening was connected to a vacuum pump. A cylindrical metal net was placed in the flask and the above polyester was rolled up around the net. The flask was placed in a water bath and deaerated with the vacuum pump for about 10 minutes. Then, a mixture of the oligomers of Examples 6 and 7 (about 1:1) containing a catalytic amount of triethylamine was added to the flask through the inlet for a reaction mixture. The treatment was carried out under various conditions as shown in Table 3. After treatment, the polyester cloth was taken out from the flask, washed with acetone (3 times) and dried under vacuum. The results are shown in Table 3.

TABLE 3

| Example No. | Treating conditions (vapor phase) | | Properties of polyester after treatment | |
|---|---|---|---|---|
| | Time (min) | Temperature (°C.) | Water* repellency | Oil** repellency |
| Control | — | — | 0 | <4 |
| 11 | 5 | 80 | 80 | 4 |
| 12 | 20 | 80 | 80 | 4 |

TABLE 3-continued

| Example No. | Treating conditions (vapor phase) | | Properties of polyester after treatment | |
|---|---|---|---|---|
| | Time (min) | Temperature (°C.) | Water* repellency | Oil** repellency |
| 13 | 60 | 80 | 90 | 4 |

*Water repellency was measured according to JIS L-1092. [Three sheets (size: about 20 cm × 20 cm) per one sample are collected and each sheet is mounted on a sample holding frame (diameter: 15 cm) with preventing wrinkling. A water repellency measuring apparatus is used. The center of the spray of the apparatus is adjusted to the center of the frame. Water at roon temperature (250 ml) is placed in the glass dropping funnel of the apparatus and is sprayed on the sample sheet (time required: 25–30 seconds). Then, the holding frame is removed from the apparatus and one edge thereof is hit against a solid material with carrying the other edge and facing the surface of the sample sheet downward. Further, the frame was revolved at 180° and the same procedure is repeated to remove excess amount of water. Then, the wetting was evaluated and scored by comparing with standard sample sheets. The result is shown by the average of the scores of the three sheets.]
**Oil repellency was measured according to AATCC Test Method 118-1975. AATCC: American Association of Textile Chemist and Colorist.

When the change in water repellency and oil repellency of each polyester cloth obtained in Examples 11 to 13 were measured with the elapse of time, little deterioration was observed.

EXAMPLES 14 TO 15

Polyvinyl alcohol cloth (hydroxy group content: 23 meq/g) was used in these examples. The same treatment with one of Examples 11 to 13 was carried out under conditions as shown in Table 4. After treatment, the polyvinyl alcohol cloth was taken out from the flask, washed with acetone (3 times) and dried under vacuum. The results are shown in Table 4.

TABLE 4

| Example No. | Treating condition (vapor phase) | | Properties of polyvinyl alcohol after treatment | |
|---|---|---|---|---|
| | Time (min) | Temperature (°C.) | Water repellency | Oil repellency |
| 14 | 5 | 80 | 90 | 5 |
| 15 | 20 | 80 | 100 | 6 |

What is claimed is:
1. A shaped article of a synthetic resin having an improved surface which comprises a synthetic resin having hydroxy groups of 0.01 to 25 meq/g in said resin wherein at least one improved surface includes synthetic resin having hydroxy groups treated with an oligomer of a fluoroalkylene oxide represented by the formula:

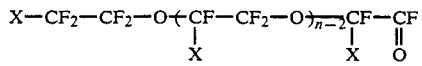

wherein X is F or $CF_3$ and n is an integer of 2 to 12.

2. A shaped article according to claim 1, wherein n is an integer of 3 to 6.

3. A shaped article according to claim 1, wherein the oligomer is that of hexafluoropropylene oxide represented by the formula:

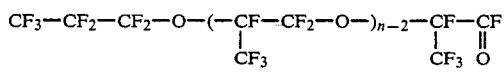

wherein n is an integer of 2 to 12.

4. A shaped article according to claim 3, wherein n is an integer of 3 to 6.

5. A shaped article according to claim 1, wherein the synthetic resin is a polyvinyl alcohol resin.

6. A shaped article according to claim 1, wherein the synthetic resin is a saponified ethylene-vinyl acetate copolymer.

7. A shaped article according to claim 1, wherein the synthetic resin is a polyester resin.

8. A shaped article according to claim 1, wherein the content of hydroxy groups of the resin is 0.05 to 25 meq/g.

9. A shaped article according to claim 1 wherein the synthetic resin is selected from the group consisting of resins with vinyl alcohol units, hydroxyethyl acrylate polymers or copolymers and polyester resins having terminal hydroxy groups.

10. A shaped article according to claim 9 wherein the resins with vinyl alcohol units are selected from the group consisting of polyvinyl alcohol resin, saponified ethylene-vinyl acetate copolymer, and polyvinyl acetal resin.

11. A shaped article according to claim 1, wherein the terminal carboxylic acid fluoride of the oligomer is esterified with a hydroxy group of the synthetic resin to firmly fix the oligomer to the surface of the resin.

* * * * *